Oct. 29, 1935.     J. A. BARLOW     2,019,170
ELECTRIC BAKER
Original Filed April 22, 1932
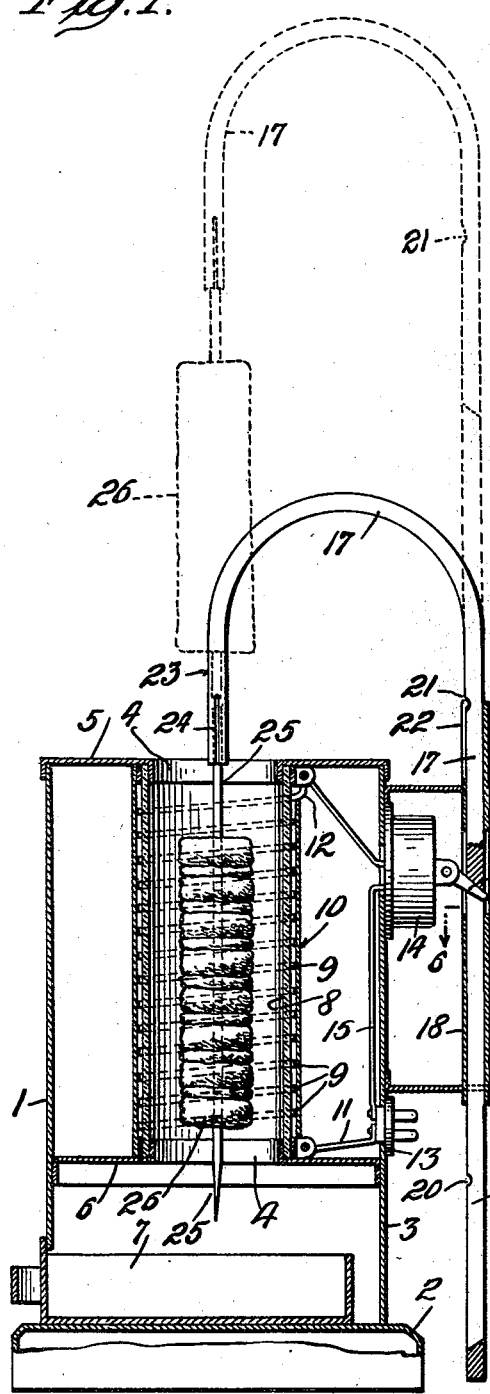
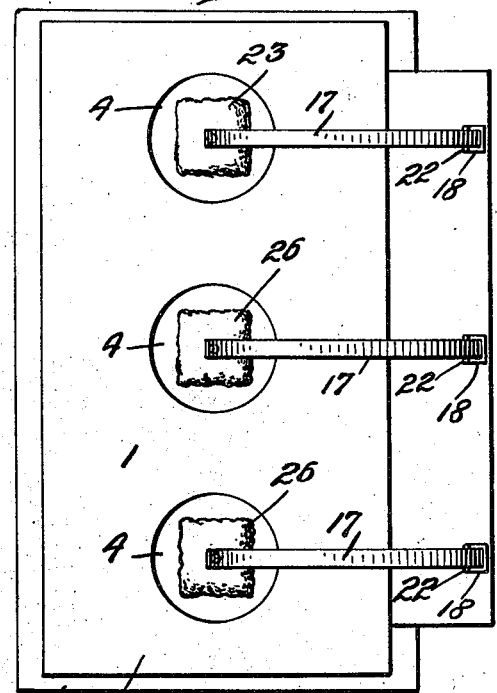
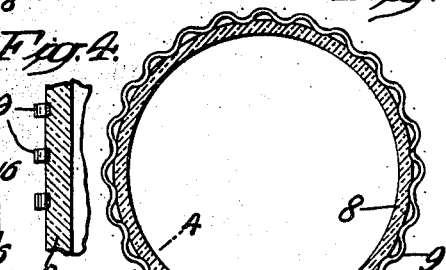
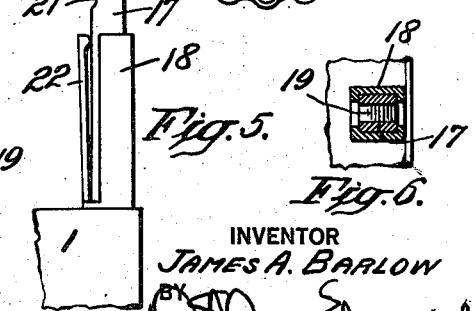
INVENTOR
JAMES A. BARLOW
BY
ATTORNEY Patented Oct. 29, 1935

2,019,170

UNITED STATES PATENT OFFICE 2,019,170

ELECTRIC BAKER

James A. Barlow, North Hackensack, N. J., assignor to Raju Holding Company, a corporation of New Jersey Application April 22, 1932, Serial No. 606,802
Renewed March 12, 1935

4 Claims. (Cl. 219—35)

The object of my invention is to provide a cooking device of this sort wherein food may be impaled on a spit, the spit placed in a suitable carrier and then lowered into a small electric oven where it may be cooked, and thereafter raised. The lowering device is connected to a switch, so that when lowered, electricity is passed through the heater and when raised, the current is cut off.

A further object is to provide a device which can be readily kept clean and which will be easy to operate. These and other objects are accomplished by my invention, one embodiment of which is hereinafter more particularly set forth.

For a more detailed description of my invention, reference is to be had to the accompanying drawing, forming a part hereof, in which Figure 1 is a sectional view of my improved heater;

Figure 2 is a plan view of the same;

Figures 3 and 4 show details of a heater;

Figures 5 and 6 show parts of a carrier.

Throughout the various views of the drawing, similar reference characters designate similar parts.

My improved baker 1 rests on any suitable base 2 and is provided with a suitable casing 3 which contains an oven 4, which rests between a top 5 and a transverse partition 6 which is above a drawer 7 which rests on the base 2, the purpose of the drawer being to receive drippings from the food which is cooked.

There are three ovens shown in this baker, and as they are identical, a description of one will answer for all. The oven is placed between the parts 5 and 6, and supported thereby, and comprises a tube of pyrex glass 8 surrounded by a sinuous ribbon 9 in the form of a helix, and surrounding this is an asbestos or other cylinder 10, which forms a heat insulator, so as to throw the heat of the heating coil 9 towards the centre. The coil 9 has two leads, the lower 11 and an upper 12, which are connected and supported in any suitable way, and insulated from each other. The lead 11 runs to one male member of a coupling 13 and the lead 12 runs to a snap switch 14 and this is also connected to a wire 15 that runs to another male member on the coupling 13. The snap switch 14 has a trigger 16 which enters a slot of a carrier 17, and is swung on its pivot by this carrier as it slides in a tube 18. This slot is designated 19 and the carrier also has two notches 20 and 21, either of which may be engaged by a spring finger 22 which is preferably made integral with a portion of the slideway 18.

When the apparatus is made and the coil 9 is in place, in the preferred embodiment of my invention, it is overheated for a time so as to cause it to embed itself in the glass 8, as shown in Figures 3 and 4. The upper end of the carrier 17 is bent to form a goose neck so that at its extreme end 23, it projects downwardly and it is made hollow and made with spring fingers 24 which are adapted to engage a spit 25 and hold the same so that the spit may be lowered into the oven 4, as shown in Figure 1, or it may be raised clear of the oven as indicated by dotted lines.

Food 26 of any suitable character may be impaled on the spit 25 and cooked as long as desired by merely lowering from the upper to the lower position, and when cooked, this is reversed and it is raised from the lower to the upper place.

It is obvious, of course, that when functioning, the coupling 13 is properly connected to a source of electric supply.

While I have shown and described one embodiment of my invention, it is obvious that it is not restricted thereto, but that it is broad enough to cover all structures that come within the scope of the annexed claims.

Having thus described my invention, what I claim is:

1. An oven composed of a casing, a heating tube vertically disposed in said casing and open at its top and bottom, a heating coil surrounding the tube, a spit adapted to be lowered in or raised out of the tube, means for holding the spit in either a raised or lowered position, switch means operated by the spit-holding means for causing power to be supplied to the coil when the spit is inserted within the tube and for causing the power to be shut off when the spit is drawn out of the tube, said switch means being provided with a projecting operating element in constant engagement with the spit-holding means and moved in opposite directions thereby upon movements of the spit-holding means and a receptacle held beneath the open bottom of the tube for receiving drippings from the food held on the spit.

2. An oven composed of a casing, a heating tube of cylindrical form vertically disposed in said casing and provided with open ends, a guide on the casing, a rod movable in said guide, said rod being provided with a part extending over one of the open ends of the tube, means at the end of said part for detachably engaging and holding a spit so that said spit is carried in or out of the heating tube by movements of the rod, means on the guide for engaging parts of the rod to hold said rod with its spit either in or out of the heating tube, and switch means operated by movements of the rod for switching power off or on to the heating tube.

3. An oven composed of a casing provided with a closed bottom, a heating tube vertically disposed in said casing and open at its top and bottom, the bottom of said tube terminating at a distance from the closed bottom of the casing, a heating coil surrounding the tube, a spit adapted to be moved in or out of the tube, means for holding the spit either in or out of the tube, switch means operated by the spit-holding means for causing power to be supplied to the coil when the spit is inserted in the tube and for causing the power to be shut off when the spit is drawn out of the tube, said switch means being provided with a projecting operating element in constant engagement with the spit-holding means and moved in opposite directions thereby upon movements of the spit-holding means, the casing having an opening in one of its walls between the bottom of the tube and the closed bottom of the casing, a receptacle removably held beneath the open bottom of the tube for receiving drippings from the food held on the spit, said receptacle acting to close the opening in the casing.

4. An oven composed of a casing provided with an upright heating chamber, a closed drip chamber therebelow, an electric heating coil encircling said chamber, a slidable bracket having a depending arm coaxial with said chamber provided with a clutch at its lower end for gripping a skewer.

JAMES A. BARLOW.